L. SCHWITZER.
UNIVERSAL JOINT.
APPLICATION FILED MAR. 9, 1910.
994,278.
Patented June 6, 1911.
2 SHEETS—SHEET 1.
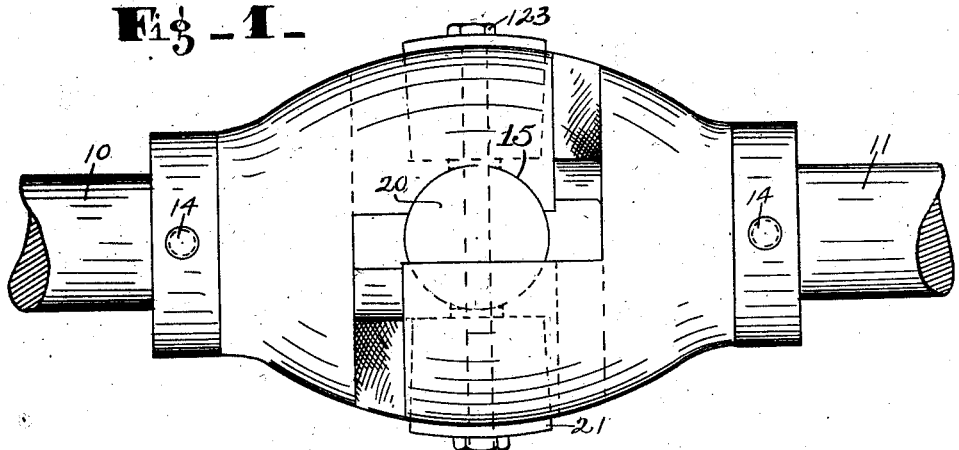
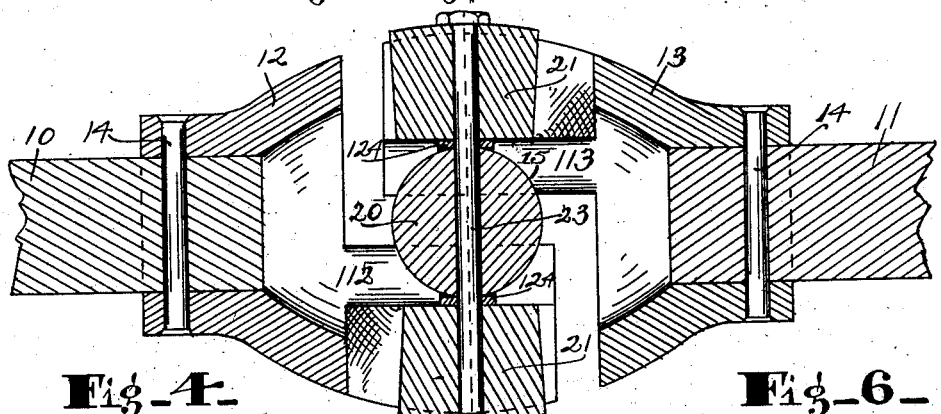
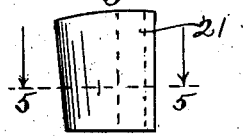
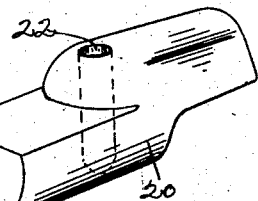
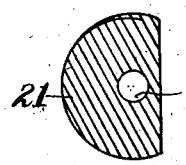
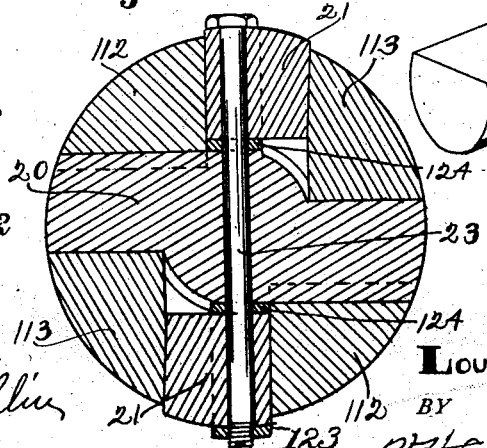
WITNESSES:
INVENTOR.
Louis Schwitzer.
BY
ATTORNEY.

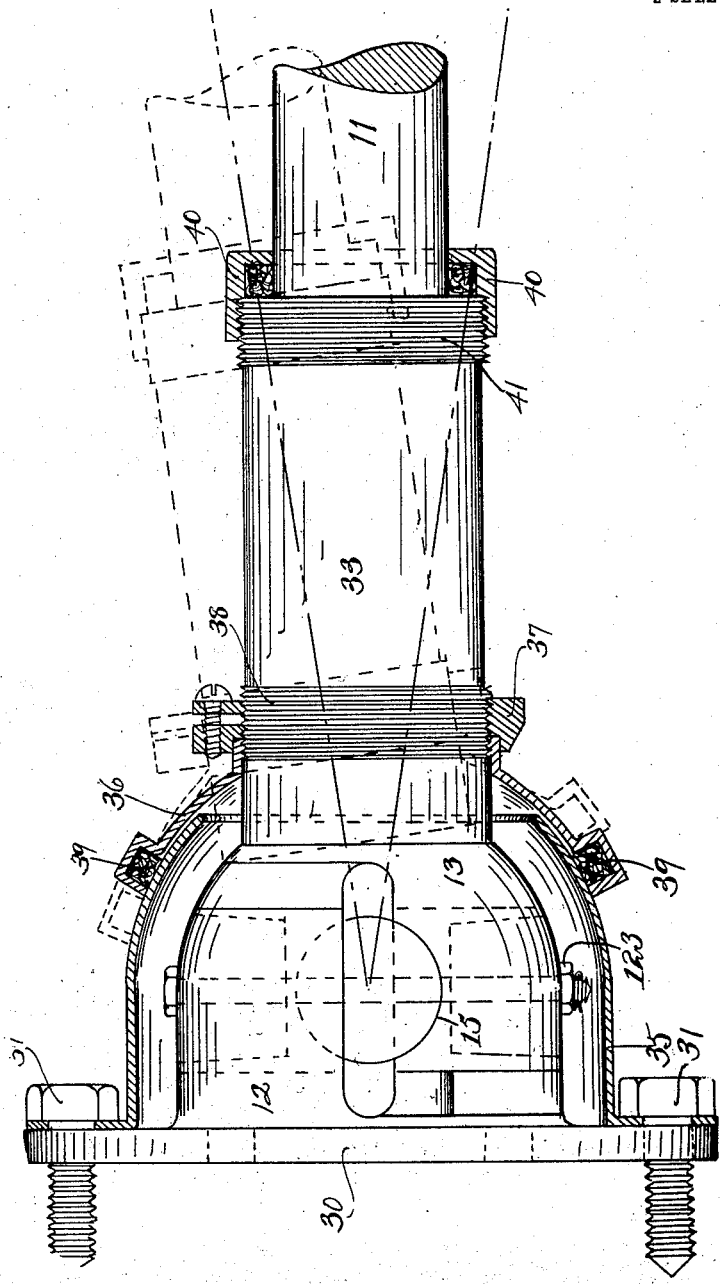

UNITED STATES PATENT OFFICE.

LOUIS SCHWITZER, OF INDIANAPOLIS, INDIANA.

UNIVERSAL JOINT.

994,278.  Specification of Letters Patent. Patented June 6, 1911.

Application filed March 9, 1910. Serial No. 548,187.

*To all whom it may concern:*

Be it known that I, LOUIS SCHWITZER, of Indianapolis, county of Marion, and State of Indiana, have invented a certain new and useful Universal Joint; and I do hereby declare that the following is a full, clear, and exact description thereof, reference being had to the accompanying drawings.

The object of this invention is to provide an improved universal coupling suitable for use in automobiles and other machines for transmitting power when flexibility of the power transmitting means is required.

This is an improvement upon the construction shown in my former application, Serial Number 484,857, filed March 22, 1909, for a universal joint.

The chief feature of the invention consists of the omission of the casing or holding means shown in my former structure and of the central ball therein, and providing a single bolt which extends diametrically and transversely through the coupling and the coupling pin and plugs. To that end two oppositely located plugs in my former structure are united and constitute a single transversely extending coupling pin with the ends offset somewhat and the other two plugs are separate from each other and held in place by the bolt which passes radially through them and transversely through the long coupling pin referred to. For tightening the joint and causing the parts to fit snugly together the two separate plugs are more than semi-circular in cross section, so that the bolt can extend through them concentrically. The ends of the long pin are likewise more than semi-circular in cross section.

The result of this improvement is the simplification of the coupling and also an increase in the ease of its operation and the strength of the construction.

The nature of the invention will be understood from the accompanying drawings and the following description and claims.

In the drawings, Figure 1 is a side elevation of the coupling uniting two shafts which are partially broken away. Fig. 2 is a central vertical longitudinal section through the coupling as shown in Fig. 1. Fig. 3 is a central transverse section through the coupling on the line 3—3 of Fig. 2. Fig. 4 is an elevation of one of the tapering pins or plugs. Fig. 5 is a section on the line 5—5 of Fig. 4. Fig. 6 is a perspective view of the long coupling pin. Fig. 7 shows a modified form with parts in side elevation and the elongated position of the shaft being indicated by dotted lines.

Two shafts 10 and 11 are shown coupled together in the first figures of the drawings. The coupling members 12 and 13 are secured to said shafts respectively by pins 14. Each of the members 12 and 13 has two oppositely located jaws 112 and 113, respectively, which are adapted to interfit, as indicated in Figs. 2 and 3, but so there will be considerable space between the ends of the jaws of one member and the body of the other member. Each jaw is segmental in cross section, and is curved less than a quarter of a circle or 90 degrees, as appears in Fig. 3. One side of each jaw is flat and the other side of each jaw has a radially disposed recess 15 that is curved in a direction longitudinally of the coupling and having about 120 degrees, as shown in Fig. 1. The curved recesses in the two jaws on each member are on diagonally opposite sides so as to coöperate with each other in receiving either the long pin 20 or the short plugs 21 which interlock the jaws of the two coupling members and prevent their separation.

The long coupling pin 20 is cylindrical at the middle but segmental in cross section at each end, each end being more than semi-circular in cross section and having a flat surface on one side, the flat surface of the ends of the pin being diagonally opposite, as shown in Figs. 3 and 6. The pin 20 has a transversely extending hole 22 through which the locking bolt 23 extends. The plugs 21 are short, their length being less than the radius of the coupling, see Fig. 3. They are formed like the ends of the long pin 20 excepting that they are tapering, their inner ends having less diameter than the outer ends. They are more than semi-circular in cross section so as to have concentric holes 22 for the bolt 23.

The coupling is assembled as follows: The long coupling pin 20 is put in place in one member with its curved surfaces on its ends fitting in the recesses of the jaws of the coupling member. The other coupling member is then put in interfitting position and the bolt 23 is inserted through the plug 21 and then through the coupling, passing through the hole 22 in the long pin 20, and the other plug 21 is placed on the projecting end of the bolt and the nut 123 secured on the end of the bolt. Washers 124 are located on the bolt between the plugs 21 and the middle portion of the long pin 20. By tightening the nut of the bolt, the tapering plugs 21 may be tightened up for making the parts of the coupling fit sungly in place and obviate unnecessary play.

In the modified form shown in Fig. 7, the member 12 of the coupling is secured or is integral with a plate 30 disposed transversely of the coupling member 12 and adapted to be secured by the lag screws 31 to any suitable part of the device in which this coupling may be employed. The other member 13 of the coupling is secured to or is integral with a tubular sleeve 33, which surrounds the shaft 11. In this construction the essential parts of the coupling are identical with those in Fig. 1, excepting the outer end of the member 12 of the coupling is not contracted, as shown in Fig. 1.

A housing surrounds the coupling in Fig. 7, and consists of one housing member 35, which is secured to the plate 30. It is spaced from the two members 12 and 13 of the coupling. The outer end of the housing member 35 is apertured to surround the sleeve 33, and the aperture is large enough to permit oscillation of the sleeve 33. The other housing member 36 is secured to the member 33 by the nut 37, which screws on the threaded portion 38 of the sleeve 33. The two housing members 35 and 36 overlap each other and suitable packing 39 is interposed between them, whereby a dust proof joint between said housing members is provided. A cap 40 screws on the threaded end 41 of the sleeve 33 and surrounds snugly the shaft 11.

I claim as my invention:

1. A universal coupling including a pair of members having interfitting jaws with a radially recessed surface, a pin extending substantially diametrically through the coupling and lying between said jaws and in the recesses thereof, a bolt extending diametrically through said coupling and through said pin, and plugs carried on each end of said bolt and lying between said jaws and in the recesses thereof and at right angles to said diametric pin.

2. A universal coupling including two oppositely placed members having each two jaws which extend toward the other member and are diagonally positioned and have a flat surface on one side and a radially disposed concave surface on the other side and adapted to interfit with the concave surface of one jaw opposing the flat surface of another jaw, a pin extending transversely through the coupling with its ends having convex and flat surfaces transversely to fit the concave and flat surfaces of the jaws, a pair of plugs formed like the ends of said transverse pin and at a right angle thereto, and a bolt extending through said pin and plugs.

3. A universal coupling including a pair of members having interfitting jaws, a pin extending diametrically through said coupling between said jaws and with its ends more than semi-circular in cross section, a pair of plugs which are more than semi-circular in cross section and which are inserted between said jaws on each side of and at a right angle to said diametric pin, and a straight bolt passing diametrically through the coupling and through said pin and plugs for holding them in place.

4. A universal coupling including two oppositely placed members having each two jaws which extend toward the other member and are diagonally positioned and have a flat surface on one side and a radially disposed concave surface on the other side and adapted to interfit with the concave surface of one jaw opposing the flat surface of another jaw, a pin extending transversely through the coupling with its ends having convex and flat surfaces to fit the concave and flat surfaces of the jaws, a pair of tapering plugs inserted between said jaws on each side of and at a right angle to said diametric pin, and a bolt passing diametrically through said pin and the plugs for holding them in place.

In witness whereof, I have hereunto affixed my signature in the presence of the witnesses herein named.

LOUIS SCHWITZER.

Witnesses:
G. H. BOINK,
H. TURNBELL.